United States Patent [19]
Lee

[11] Patent Number: 5,898,132
[45] Date of Patent: *Apr. 27, 1999

[54] LAY-IN WIREWAY

[76] Inventor: Thomas G. Lee, 9131 Montana Ct., Livonia, Mich. 48150

[*] Notice: This patent issued on a continued prosecution application filed under 37 CFR 1.53(d), and is subject to the twenty year patent term provisions of 35 U.S.C. 154(a)(2).

[21] Appl. No.: 08/864,091

[22] Filed: May 28, 1997

[51] Int. Cl.$^6$ .................................................. H02G 3/00
[52] U.S. Cl. .............................. 174/101; 16/266; 16/268
[58] Field of Search ........................ 174/72 C, 101, 174/72 A, 68.2, 68.3; 16/268, 266, 265; 138/155, 156, 157, 158, 163, 164, 167; 220/244

[56] References Cited

U.S. PATENT DOCUMENTS

| | | | |
|---|---|---|---|
| 3,636,984 | 1/1972 | Rauhauser | 138/155 |
| 3,968,322 | 7/1976 | Taylor | 174/72 A |
| 4,077,434 | 3/1978 | Sieckert et al. | 138/92 |
| 4,398,564 | 8/1983 | Young et al. | 138/92 |
| 5,013,873 | 5/1991 | Deibele et al. | 174/101 |
| 5,024,251 | 6/1991 | Chapman | 138/92 |

FOREIGN PATENT DOCUMENTS

| | | | |
|---|---|---|---|
| 183260 | 3/1956 | Sweden | 174/68.3 |
| 157210 | 11/1932 | Switzerland | 16/128 |

*Primary Examiner*—Nestor Ramirez
*Assistant Examiner*—Joseph Waks
*Attorney, Agent, or Firm*—Gifford, Krass, Groh, Sprinkle, Anderson & Citkowski, P.C.

[57] ABSTRACT

A lay-in wireway for cords, wires and the like for use in connection with machinery employs a laser cut, sheet steel, U-shaped trough having an end configuration allowing it to be attached to similar troughs and angled connectors to form the wireway system. Removable knockouts are formed in the side walls opening to the top edge of the sides. A detachable cover member may be locked into place on one side and pivoted to cover the top of the trough. While the cover is open wires and cords may be inserted through the passageways formed by the knockout and then retained securely in place by the closed cover.

6 Claims, 3 Drawing Sheets

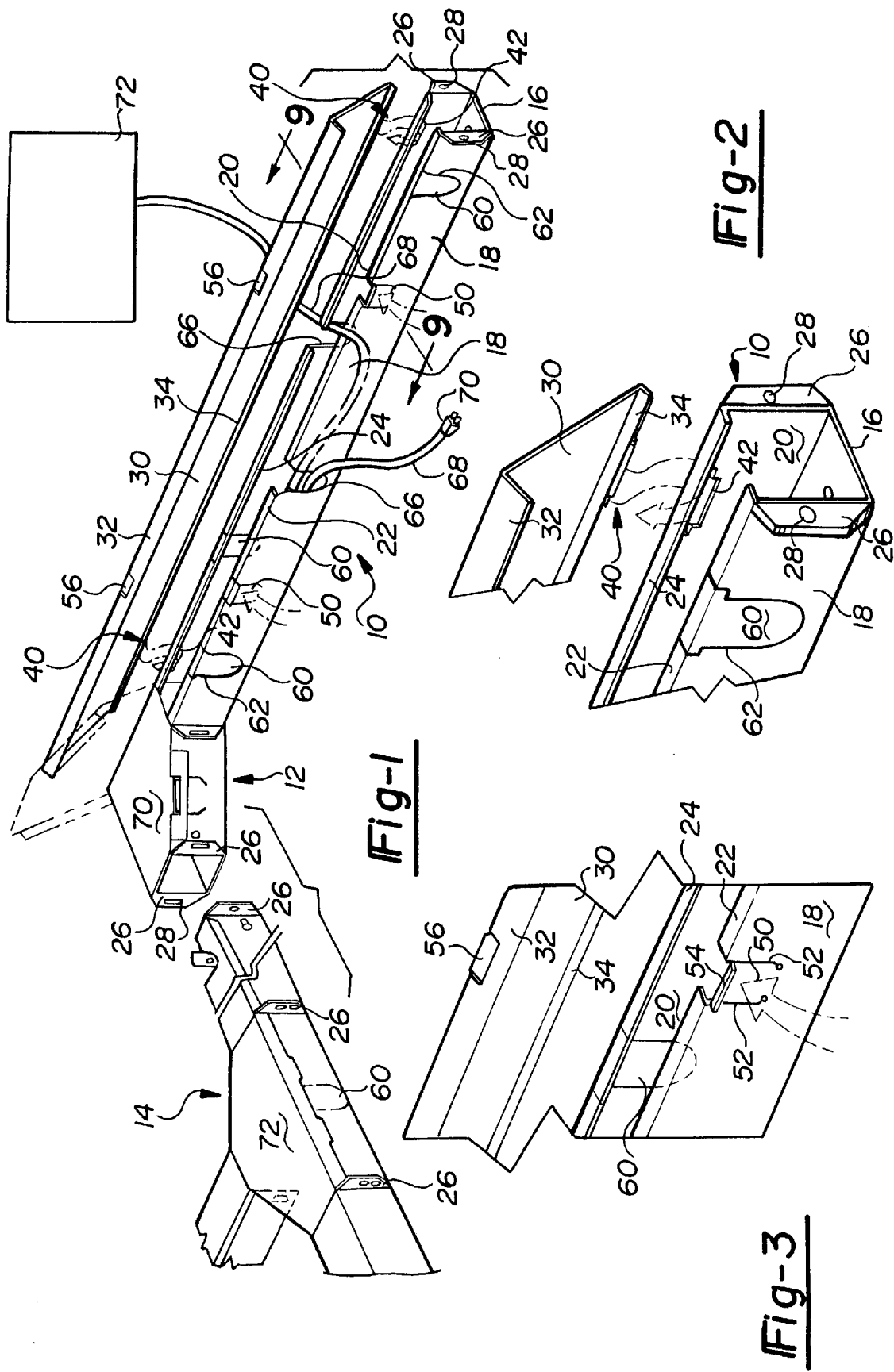

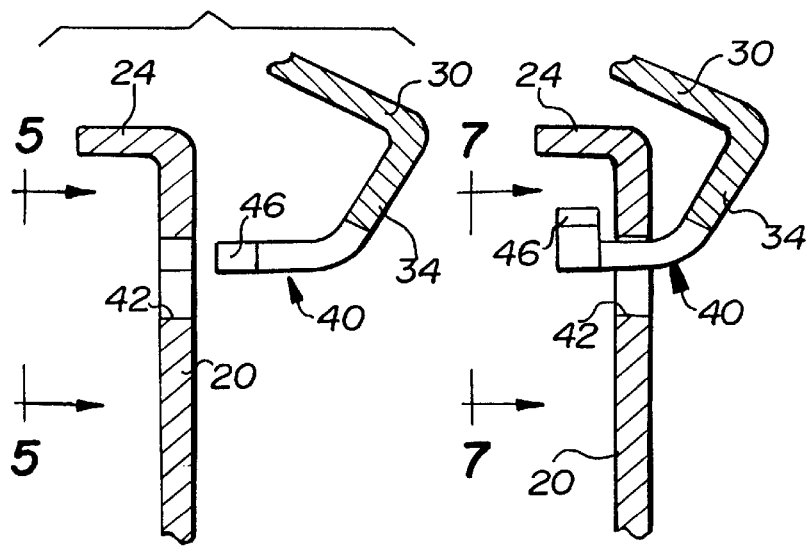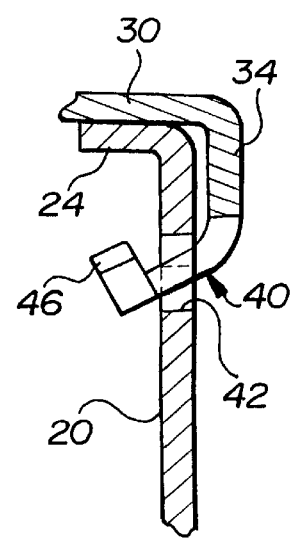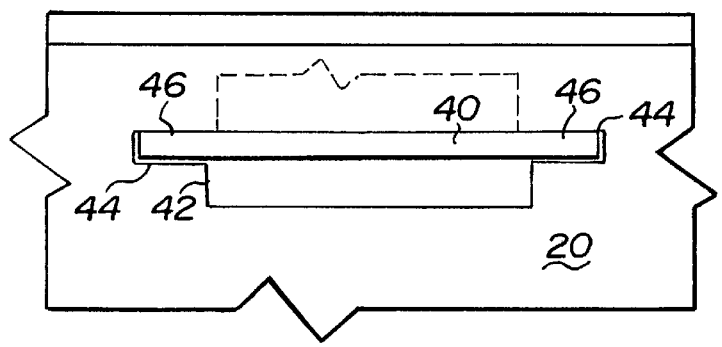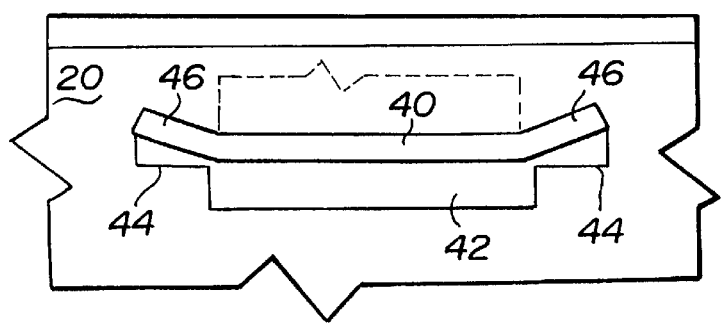

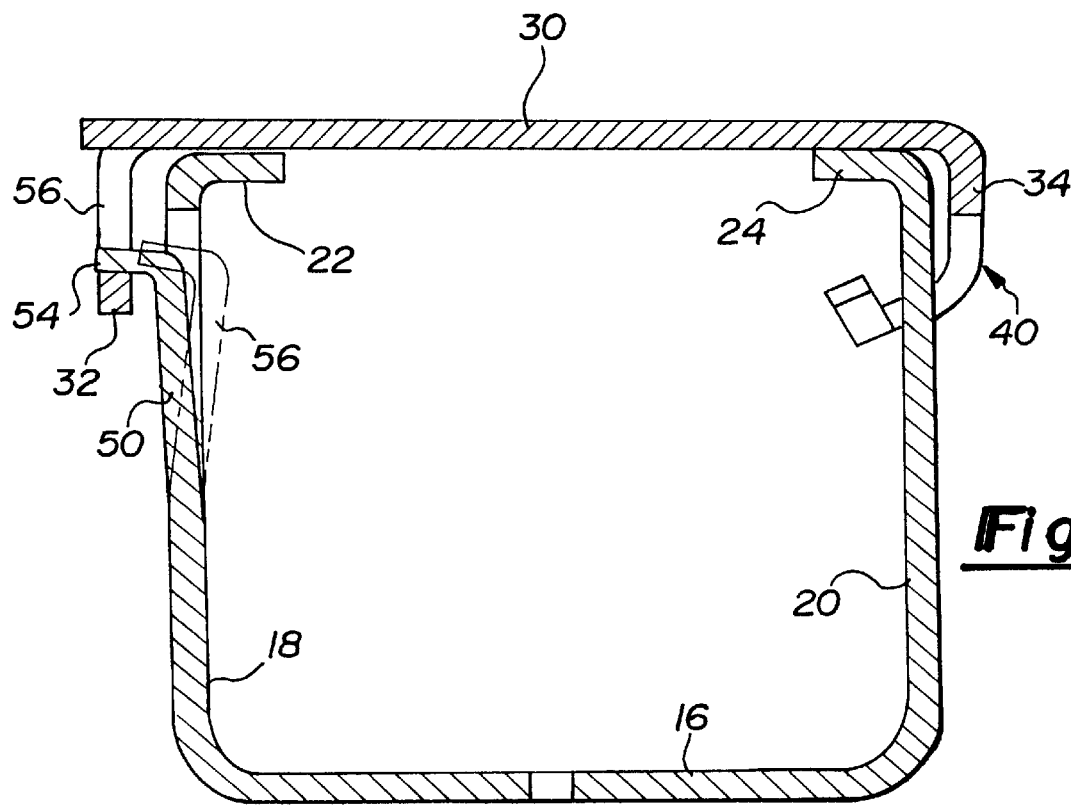
_Fig-9_
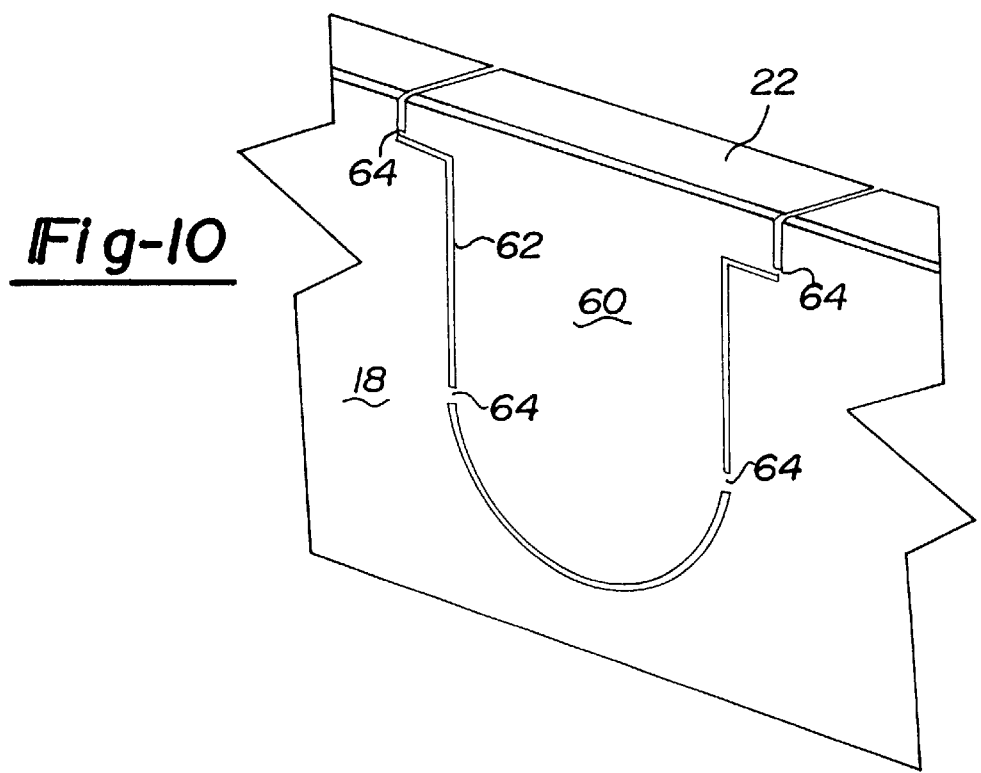
_Fig-10_

LAY-IN WIREWAY

FIELD OF THE INVENTION

This invention relates to lay-in wireways for cords and the like, of the type including elongated U-shaped open-top troughs with passages in their side walls opening onto the tops of the troughs and having hinged, removable covers which close off the tops of the side openings to lock cords in position within the wireways.

BACKGROUND OF THE INVENTION

Wireways or wiring ducts are used in factories to guide and support electrical wiring in an orderly manner and to protect the wires from the dust and fluids commonly found in industrial environments. A common form of wireway employs elongated U-shaped troughs having end fittings which allow them to connect to other troughs, elbows or tees having similar fittings. These fittings may be joined in a wide variety of combinations to adapt to a particular application.

Often the wireways are used with cords which have connectors or machines secured to their ends before they are to be placed in the troughs. In such situations troughs having knockouts in their sides which may be removed to form passages connected to the tops of the troughs are used so that the cords may be passed into and out of the wireways through the side openings without the need for removing the cords from their machines or connectors. The need exists for such a lay-in wireway which is low in cost, easy to install in industrial environments, and provides good physical protection for wiring in general and cords in particular.

SUMMARY OF THE INVENTION

The present invention is directed toward sections of lay-in wireway which may be joined to other sections to form a complete system and which include straight line sections consisting of U-shaped troughs with inwardly projecting lips formed at the free ends of the walls. Certain of the side walls include knockouts formed by narrow U-shaped slits formed through the thickness of the wall section with the legs of the slit extending to the open top edge of the side wall. The slits are interrupted with very thin tabs which may be cut or torn to remove the knockout and form an aperture in the wall opening to the top of the trough. A flat cover for the wireway includes downturned edges adapted to extend over the side walls at the open top of the trough. Inwardly turned tabs are formed at the edges of one of the downturned sections and may be inserted into slots formed in one of the side walls below the top edge to form a hinge between the side wall and the cover. The hinge allows the cover to move between a closed position in which the cover extends over the open end of the trough and an open position in which the cover is pivoted with respect to its closed position to allow access to the wireway.

The cover may be removed by withdrawing the tabs in the cover from the slots in the side wall to allow cords to be laid in the wireway and to pass through apertures where knockouts have been removed along the length of the system. The covers are then rejoined to the troughs by inserting the tabs in the slots, thereby closing off at least those apertures in the side wall which support the cover. The tabs have sections which may be bent to prevent removal of the cover without the use of tools to ensure the security of the cords which are retained in the wireway system.

The troughs, the connecting end sections, and their covers are all preferably formed of sheet steel by laser cutting and then bending. The laser can easily form the U-shaped knockouts and their connecting tabs.

Other objectives, advantages and applications of the present invention will be made apparent by the following detailed description of a preferred embodiment of the invention. The description makes reference to the accompanying drawings in which:

BRIEF DESCRIPTION OF THE DRAWINGS

FIG. 1 is a perspective, exploded view of a portion of a lay-in wire system formed in accordance with a preferred embodiment of the invention, with the cover of one of the trough sections in a removed position;

FIG. 2 is a detail, in perspective form, of a section of a trough forming part of the system of FIG. 1;

FIG. 3 is a detail, in perspective form, of a section of a trough forming part of the system of FIG. 1;

FIG. 4 is a detailed cross-sectional view through a trough forming the preferred embodiment of the invention with the cover section removed;

FIG. 5 is a view of the section of the trough illustrated in FIG. 4, taken along lines 5—5 of FIG. 4;

FIG. 6 is a detailed sectional view of the trough illustrating a cover inserted into the trough wall, in open position;

FIG. 7 is a view of FIG. 6, taken along lines 7—7 of FIG. 6;

FIG. 8 is a detailed sectional view through the wall of the trough showing a cover in closed position;

FIG. 9 is a cross-section through a trough forming part of system 1, taken along lines 9—9 of FIG. 1; and FIG. 10 is a detailed view of a wall section of a trough of FIG. 1 illustrating a knockout before removal.

DETAILED DESCRIPTION OF THE PREFERRED EMBODIMENT

A lay-in wireway of the preferred embodiment of the invention is preferably fabricated of sheet galvanized steel bent into an appropriate form. The basic unit consists of a linear trough section, generally indicated at 10 in FIG. 1, which may be provided in a variety of lengths. L-shaped right angle connector sections, generally indicated at 12, T sections, generally indicated at 14, and other transition shapes may be joined together with the linear sections 10 to create a customized wireway system.

The linear wireway generally indicated at 10 has a U-shaped cross-section consisting of a flat base 16 and a pair of parallel upturned side walls 18 and 20 bent upwardly from the base 16. The edges of the side walls 18 and 20 opposite to the edges affixed to the base 16 are formed with 90° bent lips, 22 and 24 respectively, which project inwardly so as to extend over the base 16.

The two linear ends of the trough section 10, as well as the angled connecting sections 12 and 14, have their side walls formed with outwardly extending tabs 26 formed with central screw holes 28 that allow the sections to be connected together with screws and bolts or other appropriate fasteners to form a complete system.

The linear section 10 is provided with an elongated cover formed of a top section 30 of a similar configuration to the base 16 with downturned edge sections 32 and 34 configured to straddle the upper edges of the outer side walls 18 and 20 when the cover is in a closed position.

The cover 30 is adapted to be attached to the wireway 10 by means of hinge tabs, generally indicated at 40, formed at points along the downturned edge section 34 of the cover. The cover 30 illustrated in FIG. 1 has two of the hinge tabs formed adjacent its two ends, but a larger number of tabs could be used in longer raceway sections. The hinge tabs 40 are adapted to be inserted into slots 42 formed at complementary positions along the length of trough 10, so as to receive the tabs 40. As is best illustrated in FIGS. 4–7, the tabs 40 are bent inwardly from the downturned edges 34 of the cover 30, in the direction of the cover. Their ends are each formed with a pair of outwardly extending sections 46 which are adapted to pass through narrow slots 44 formed at the ends of the slots 42 as is best seen in FIG. 5. After insertion, the extending sections 46 may then be bent upwardly, out of the plane of the tab section 40, as illustrated in FIG. 7, using pliers or the like. This effectively locks the cover 30 onto the trough section to prevent casual removal. The same tool used to bend the extending sections into a locked position may be later used to bend them back, allowing removal of the cover. With the extending sections in their locked position, the cover may be moved between an open position, illustrated in FIG. 6, and a closed position, illustrated in FIG. 8, in which the downturned sections 32 and 34 straddle the upper ends of the side walls 18 and 20 and effectively close the trough.

As is best seen in FIGS. 3 and 9, the side wall 18 of the trough is formed with locking tabs 50 which open on the upper end of the side walls and are formed by a pair of parallel slits 52 formed along the height of the side wall. The tabs 50 are normally bent slightly outwardly of the plane of the side wall 18 and terminate in their upper ends in lock sections 54 which are bent away from the trough.

The downturned edge 32 of the cover 30 is formed with complementary slots 56 which receive the lock sections 54 when the cover 30 is in a closed position. As is illustrated in FIG. 9, the locking tabs 50 may be manually bent into a retracted position 56 to allow the cover to close into a locked position and to release the cover so it may be moved to an open position. Normally, in the closed position, the locks 54 are engaged within the cover slots 56 to securely retain the cover in the closed position.

In an alternative embodiment of the invention the locking mechanism for the cover 30 could employ semi-spherical dimples formed outwardly below the edges of the side wall 18 which would seat in circular holes formed in the downturned edge 32 of the cover. This arrangement could be reversed with the dimples being formed in the edge 32 to seat in holes formed in the side wall 18. Manual pressure could release the engagement to open the cover.

As is best illustrated in FIG. 10 the side walls 18 and 20 of the trough are formed at regular intervals with knockout sections 60. The knockouts are each defined by a thin slit 62 formed through the walls, preferably by a laser cutter. The slits 62 are generally U-shaped and extends through the inturned lip 22 of the side wall 18 or the lip 24 of the side wall 20. The slit 62 are interrupted at several points by tabs 64. The interrupting tabs 64 are preferably between about 1/16–3/16 of an inch in thickness. They may be torn to allow the knockouts to be removed from the side walls 18 or 20, to form passages 66 through which wires or cords 68 may be passed when the cover 30 is opened in the case of the side wall 18, or removed in the case of the side wall 20. This allows for the convenient insertion or removal of cords such as 68, which may have connectors 70 on their ends that cannot pass through the passages 66, or may be connected to machine tool 72 or the like so that they could not be threaded through the closed passages.

When the cover is in place the tops of the passages are closed off so the cords or wires are permanently locked in position. The angled connecting sections 12, 14 and the like may be similarly formed with appropriate covers 70 or 72 which may hinge from their side walls and lock to the side walls in the same manner as the linear trough. These wireways may be joined in appropriate custom configurations to receive the wiring associated with machine tools and the like and collected in an orderly manner that also protects the cords or wiring from damage.

The entire raceway configurations may be preferably formed by laser cutting planar sheet steel and then bending it so as to provide a unitary, simple, inexpensive structure.

Having thus described my invention I claim:

1. A lay-in wireway comprising:

a planar base having a pair of parallel front and back edges;

a pair of substantially planar walls affixed to the base at said parallel edges of the base, said walls extending substantially normally to the base and terminating at upper edges;

a lip formed at each of said upper edges of said walls, said lips projecting inwardly so as to extend over said base;

a general U-shaped cut-out formed through at least one of said planar walls and through the lip formed at said upper edge of said wall, said cut-out being interrupted at a plurality of points forming a removable knockout which, when removed, forms a generally U-shaped slit in said wall extending to and including at least a portion of the upper edge of said wall;

a planar cover member for the wireway having parallel opposed edges and including downturned sections formed along said opposed edges, the downturned sections projecting toward said base when said cover is supported on top of said walls;

a plurality of inwardly turned tabs formed on one of said downturned sections of the cover, each of said tabs including one or more bendable sections; and slots formed at spaced intervals in one of said planar walls, said slots being configured to receive said tabs with said bendable sections in an unbended state, after which said bendable sections are bent to retain said tabs within said slots so as to form a hinge which supports said cover with respect to said wall for motion between a first position in which said cover overlies the walls and encloses said wireway, closing off said opening in the wall which occurs upon removal of said knockout, and a second, open position wherein said cover is pivoted with respect to said first position to allow insertion and removal of wires from said wireways through said opening in the wall formed upon removal of the knockout.

2. The lay-in wireway of claim 1 further including a pair of outwardly turned flanges formed integrally with the walls at each end of the walls, said flanges having apertures formed therein for allowing a plurality of wireways to be joined together in a complete system.

3. The lay-in wireway of claim 1 wherein said plurality of substantially planar wall members comprise a pair of wall members extending parallel to one another to form, along with the planar base, a U-shaped section.

4. The lay-in wireway of claim 1 wherein said planar base and a plurality of substantially planar wall members are formed by laser cutting from a flat stock and bending the stock.

5. The lay-in wireway of claim 1 including a planar section formed integrally with one of said planar walls extending parallel to the base adapted to engage an aperture formed in a respective one of said downturned edge sections of said cover to restrict removal of said cover from said first position to said second position.

6. The lay-in wireway of claim 1 wherein said thin tabs which interrupt said U-shaped slit have extension in the direction of the slit of less than 0.175 inches.

* * * * *